United States Patent
Loscalzo et al.

(10) Patent No.: US 7,324,871 B2
(45) Date of Patent: Jan. 29, 2008

(54) SYSTEM AND METHOD FOR RETAINING SENSORY DATA OBJECTIVITY WHEN SENSORY DATA IS INTERNALIZED BY A SYSTEM

(75) Inventors: Andrew J. Loscalzo, Bettendorf, IA (US); Joshua L. Benhart, Moline, IL (US); David E. Cutright, Moline, IL (US)

(73) Assignee: Psychodyne Systems, Inc., Bettendorf, IA (US)

( * ) Notice: Subject to any disclaimer, the term of this patent is extended or adjusted under 35 U.S.C. 154(b) by 736 days.

(21) Appl. No.: 10/921,330

(22) Filed: Aug. 19, 2004

(65) Prior Publication Data

US 2005/0021185 A1 Jan. 27, 2005

Related U.S. Application Data

(63) Continuation-in-part of application No. 10/804,026, filed on Mar. 19, 2004, now abandoned.

(60) Provisional application No. 60/456,224, filed on Mar. 21, 2003.

(51) Int. Cl.
*G06F 19/00* (2006.01)

(52) U.S. Cl. ............ 700/245; 700/258; 700/259; 706/13; 706/14; 706/15; 318/568.1; 901/1; 901/2; 901/9; 701/23

(58) Field of Classification Search ........... 700/245, 700/258, 259; 706/13, 14, 15; 318/568.1; 901/1; 703/23
See application file for complete search history.

(56) References Cited

U.S. PATENT DOCUMENTS

| | | | |
|---|---|---|---|
| 5,390,282 A * | 2/1995 | Koza et al. | 706/13 |
| 5,880,731 A * | 3/1999 | Liles et al. | 715/758 |
| 6,490,570 B1 | 12/2002 | Numaoka | |
| 6,544,193 B2 * | 4/2003 | Abreu | 600/558 |

* cited by examiner

*Primary Examiner*—Thomas Black
*Assistant Examiner*—McDieunel Marc
(74) *Attorney, Agent, or Firm*—Hoffman Wasson & Gitler, P.C.

(57) ABSTRACT

A fully integrated system and method that provides for a system that generates fundamental differences between a host system and sensory data. The system processing covers a series of contrasting sensory data ranges that are comprised of sensory streams, sight, sound, temperature, etc. The ranges establish a point of reference within a host system for contrast with external sensory data. A static range of the system is contrasted with the active range producing an impact variation (a measurable difference) between the ranges. The processing effected by the system utilizes the monitored impact variations resulting from the contrasting sensory ranges, in conjunction with multiple sensory stream integration to resolve the problem of retaining sensory data objectivity when sensory data is internalized by a system.

7 Claims, 9 Drawing Sheets

Active Range
(Unconditioned Response - Avoidance)

Active Range (Rating)

SYSTEM AND METHOD FOR RETAINING SENSORY DATA OBJECTIVITY WHEN SENSORY DATA IS INTERNALIZED BY A SYSTEM

CROSS-REFERENCE APPLICATION

This application is a Continuation-In-Part Application of Ser. No. 10/804,026 filed Mar. 19, 2004 now abandoned. The present patent application claims the priority of provisional patent application 60/456,224 filed March 21, 2003.

FIELD OF THE INVENTION

The present Invention relates to a computer based system and method for processing sensory data to develop unconditioned and conditioned responses in existing artificial intelligent devices such as embodied in personal computers.

BACKGROUND OF THE INVENTION

Broadly speaking, existing systems operate on an input/output sequence which results in a programmed stimulus that elicits a programmed response. The problem encountered with this standard mode of operation is that current systems, by design, cannot retain sensory data objectivity when sensory data is internalized. Retaining sensory data objectivity is the process by which a system retains a difference between itself and sensory data. In order to retain a difference between a system and sensory data, a system must first generate a measurable difference between an internalized set of static ranges for particular variables and an active, sensed range for these variables. Existing systems lack a comparative process upon which differences are generated. The developmental focus of existing systems is on peripheral devices such as visual attention, reflex actions, head and neck orientation, balance, walking, stair climbing, etc. Some systems that lack access to sensory data, such as a personal computer, process information only. There are no known prior attempts that resolve the problem of retaining sensory data objectivity when sensory data is internalized by a system.

U.S. Pat. No. 6,490,570, issued to Numaoka describes a system, such as used in artificial intelligence, to develop conditioned reflexes. This system includes a conditioning unit adapted to receive signals indicative of the existence of unsatisfied operational requirements in application modules of the system. Signals indicative of the manifestation perceptible to external users of the existence of an unfilled operational requirement, as well as signals indicating the detection of satisfaction events are applied to the system. The system would then generate a signal indicating the probability of satisfaction of an unsatisfied operational requirement. However, this system does not anticipate the present invention of comparing received sensory data, and internalized sensory data, to produce an unconditioned and a conditioned response to one or more external stimuli.

SUMMARY OF THE INVENTION

The shortcomings and limitations of the prior art are obviated, in accordance with the present invention, by providing a system and method for generating and retaining measurable differences between sensory data and internalized data of the same variables, (as independent variables), allowing a learned response to be produced.

In accordance with one aspect of the invention, a system and method for creating a system for the presentation and contrasting of random external sensory data employing active and static sensory ranges is provided. An active range reflecting external world sensory data is used as input variables to the system. Those active range variables are compared to a static range consisting of stationary sensory parameters as a constant. A comparative process results in an impact variation which is the measurable difference between the ranges. The degree of variation is determined by the intensity of the external stimulus, (sensory data reflected in the active range), when compared to the corresponding sensory stream in the static range. The degree of variation determines the response, which is drawn from an attraction (comfort) or avoidance (discomfort) platform.

Generally, any response which is not considered to be in accordance would be considered to be avoidance (i.e., the comfort level). This is the primary or unconditioned response. The unconditioned response is a knee-jerk or reactionary response to random stimuli. The unconditioned response is based on the intensity of the adopted stimulus in the active range when compared to the corresponding sensory stream parameter in the static range. The comparative process determines an impact variation or difference between the ranges. The degree of difference between the ranges determines the response, either attraction or avoidance. The system then integrates the stimulus with the impact variation, (the measured difference between ranges), and the unconditioned elicited response. This integrated data is stored in a memory for later use. A secondary, or conditioned response, when warranted, is elicited when a match is found between a current stimulus and a previously processed stimulus stored in the memory. The system uses a single sensory modality cue (a current stimulus) to retrieve the previously processed stimulus, impact variation, and response.

Broadly speaking, the system and method provides for a system that through the use of the active and static sensory data ranges establishes a point of reference within a host system as a constant for comparison with external active sensory data. This process generates a measurable and retainable difference between the system and the external world. Thus, the system retains sensory data objectivity when sensory data is internalized by the system. The present invention, by design, is adaptable to Artificial Intelligence systems, personal computers, robots, etc. These and other aspects of the invention are described in detail with reference to the accompanying figures.

DETAILED DESCRIPTION OF THE PREFERRED EMBODIMENT

Figure 1:
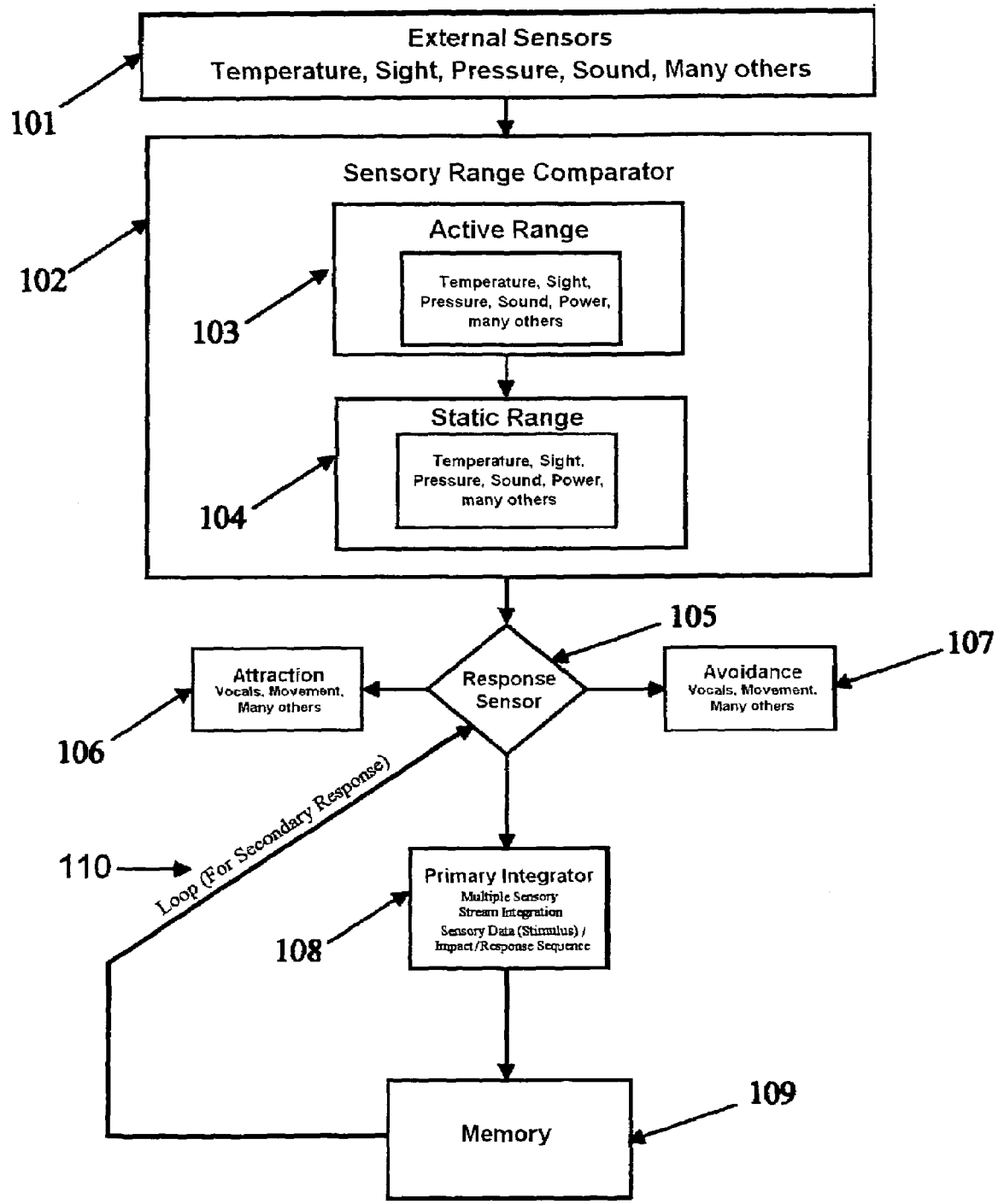
FIG. 1 is a block diagram of components comprising a computer based automated system for processing, storing, and retrieving contrasting sensory data and acting upon unlearned and learned responses to the data.

With reference to FIG. 1, there is shown a high-level block diagram of components comprising a computer based automated system. In particular, the system includes external sensors 101, and a sensory range comparator 102, including an active range 103 and a static range 104. As illustrated in the drawing, many different types of sensors, such as temperature sensors, illumination sensors, pressure sensors, and sound sensors can be activated. However, the invention is not construed to be limited to any of these types of sensors. Also included is a response sensor 105, an attraction (comfort) response 106, an avoidance or (discomfort) response 107, a primary integrator 108, memory 109 and a loop for a secondary response 110 based upon a learned or conditioned behavior.

The system's sensors are depicted as external sensors 101, which applies to the external sensory data to the system's sensory range comparator 102. The external sensory data is received by the sensory range comparators active range 103, in which sensory streams are ranked by order of intensity by use of a comparative percentile algorithm. The active range represents external, real world stimuli as variables. The process determines which data stream (sight, sound, temperature, pressure, power level, etc.) will be acted upon first. The data is then presented to the sensory range comparators static range (independent variables) 104 for comparison. The static range 104 is the internal sensory parameter range, which includes tolerances, (a constant), of the system. The static range 104 is provided in a memory device. This memory could be a standard RAM or ROM-type memory, or could be hard wired into the system, similar to a biological systems physical sensory parameter (ranges and tolerances). The difference between the active (external world) range and the static (internal system) range establishes an impact variation within the system. The impact variation is the difference of the static range from the active range. The degree of variation between the ranges (active vs. static) is then applied to the response sensor 105. A microprocessor in conjunction with a short-term memory device would be used to make the proper comparisons and calculations.

The response sensor determines either the attraction (comfort) response 106, or the avoidance (discomfort) response 107 determined by the intensity of the impact variation and the resident system. The primary response, which is an unconditioned or reactionary response, is elicited to all impact variations, including variations that are within sensory parameter ranges as well as those that exceed an established sensory parameter tolerance in the static range. The primary integrator 108 associates the external stimulus with the impact variation and the elicited response along with any additional sensory data processed with the adopted stimulus. The integrated data is then applied to memory 109. This memory could be a standard RAM or ROM-type memory, or any other type of memory capable to be stored on a hard drive of a PC. The system then searches for a stimulus match (previously processed stimulus) in the memory 109. If a match for the stimulus is found, it will update the previously stored stimulus in the memory 109 with the immediate impact variation and response. In turn, the newly updated data is looped back 110 to the response sensor 105 to determine a secondary (conditioned) response. The system will only initiate a secondary (conditioned) response when a previously processed (stored) stimulus is found. If the system does not find a match for the current stimulus in memory 109, it will store the stimulus with the integrated data.

Figure 2:
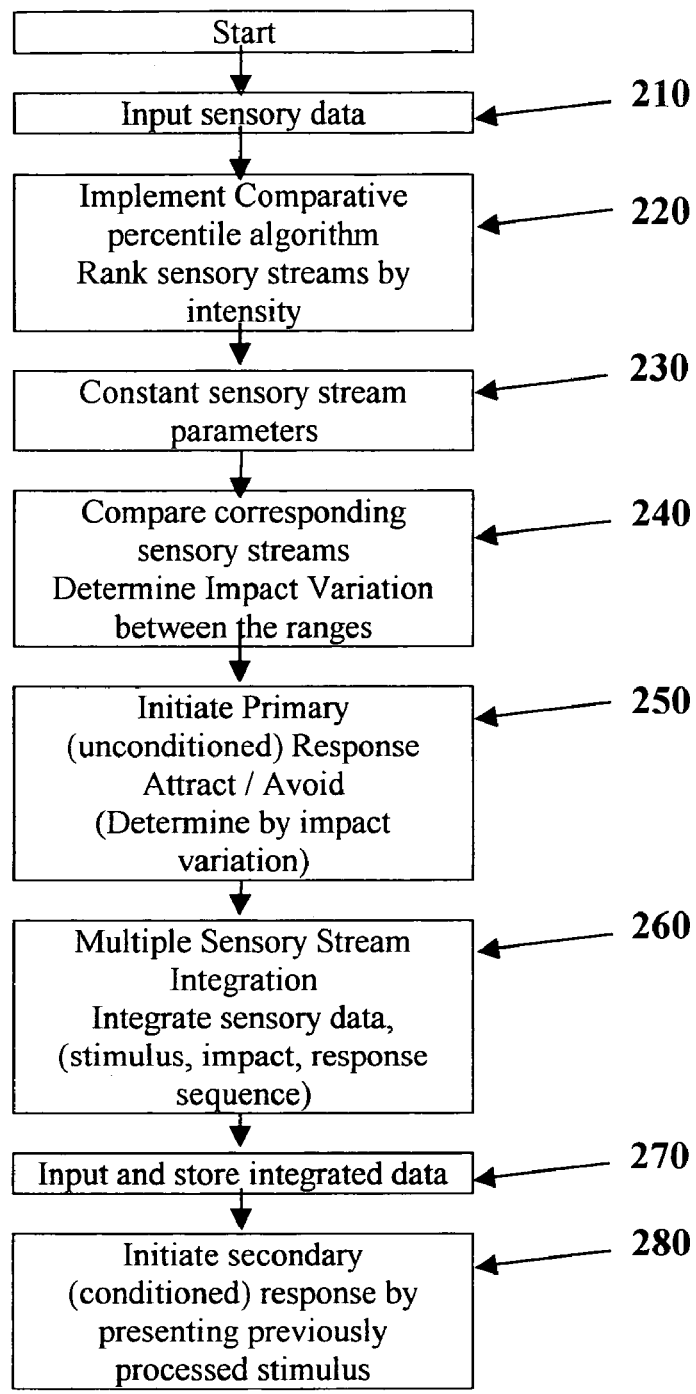
FIG. 2 is a flow diagram describing the specific processes of how the system receives sensory data, establishes a point of reference for contrast, elicits a primary (unconditioned) response, integrates, stores, and retrieves the data for the secondary (conditioned) response.

FIG. 2 illustrates a flow diagram demonstrating the process of the present invention. Starting with the external sensors 210, the system receives the external sensory streams. The data is then presented to the active range 220 where the system will rank sensory steams by order of intensity to determine priority. The data from the active range is then presented to the static range 230 in the order of the ranked intensities of the sensed variables. A comparative process 240 determines the impact variation. The system will then initiate a primary (unconditioned) response (attraction or avoidance) 250. The impact variation and the response are then integrated with the stimulus 260. The integrated data is then transmitted to memory 270 where it is stored. When a previously processed stimulus is introduced to the system and identified as stored, (previously experienced) a secondary (conditioned) response 280 is elicited. The process establishes an integrated stimulus/impact variation/response/storage/retrieval sequence.

Figure 3:
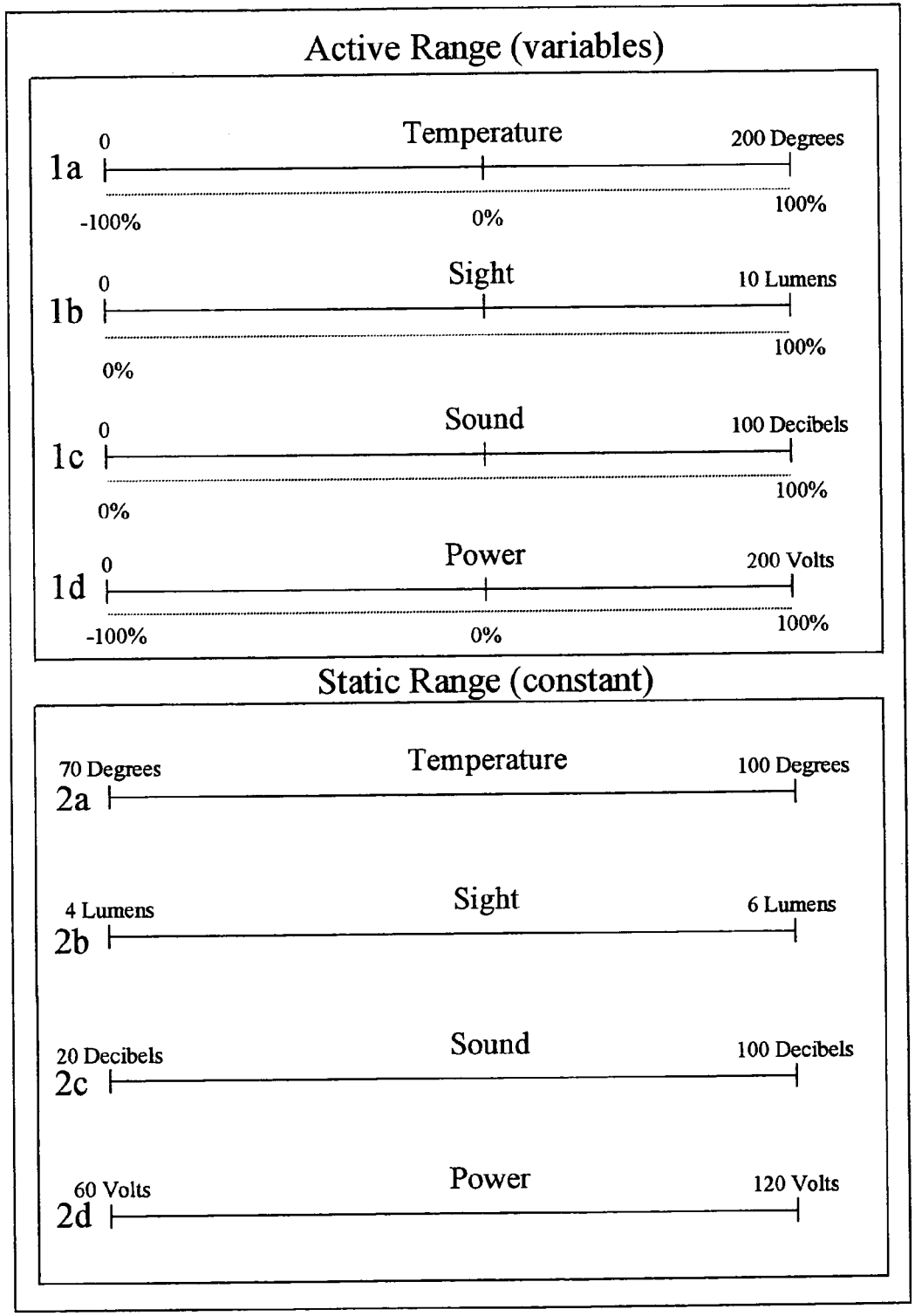
FIG. 3 is a generalized block diagram of typical functions of the sensory range comparator, which is comprised of two ranges, active and static, and of the comparative percentile algorithm method used to rank and compare sensory data.

FIG. 3 depicts the system's sensory range comparator, which consists of an active range and a static range. The active range reflects actual external world sensory data as variables. Depicted are sensory streams, which are labeled as follows: temperature 1*a*, sight 1*b*, sound 1*c*, and power 1*d*. In addition, each sensory stream is assigned a unit of measure, degrees, lumens, decibels, and volts or the like. Further, a percentile algorithm method is applied to determine the intensity of each individual sensory stream. The comparative percentile algorithm method utilizes a percentage range from a positive one hundred, to zero, and/or to a negative one hundred percent (using an absolute value for comparison). It is noted that both the active and static ranges as shown in FIG. 3 can be altered.

After determining the value of each sensory stream, 1*a*-1*d*, the established percentage value of each active range stream is compared, to determine the sensory stream of the greatest intensity (the most extreme value from zero). This adopted sensory stream is then presented to its corresponding constant sensory stream (static range), 2*a*-2*d*, for comparison. As the system uses auxiliary power (a finite supply), that actual power level is reflected in the active range, 1*d*, (as a variable) for comparison with the corresponding sensory parameter in the static range 2*d* (a constant or independent variable). As the power level changes with use, (a drop or a surge), the system when warranted, (determined by the degree of the impact variation), elicits the appropriate response.

Having explained the system of the invention in generalities, an example will now be provided utilizing the charts depicted in FIGS. 4-12.

Figure 4:
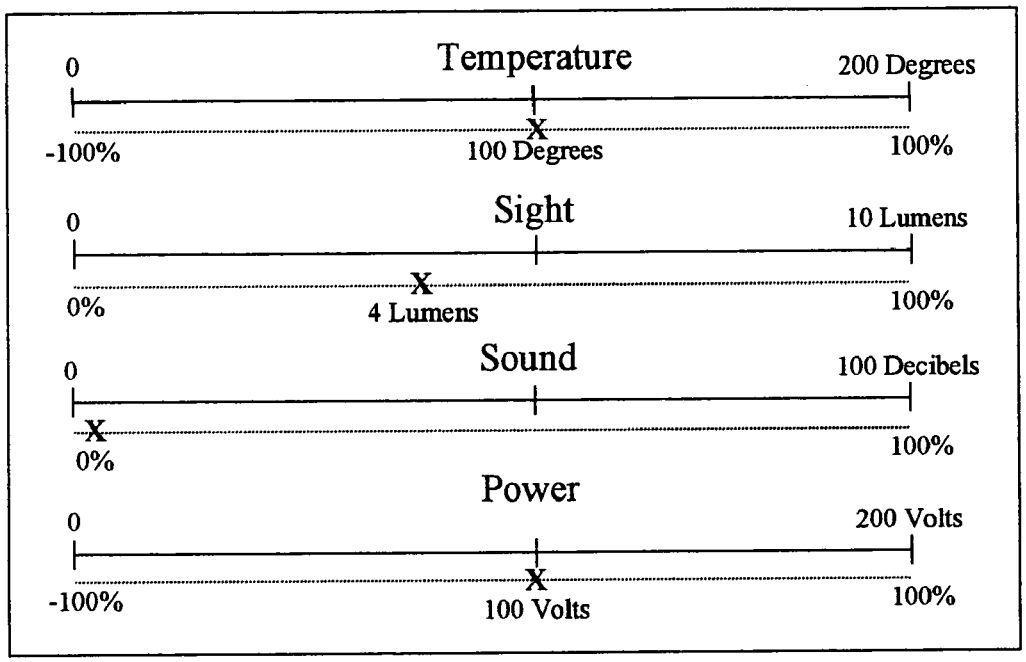
FIG. 4 is a chart showing a first pass of sensed data in the active range.
Figure 5:
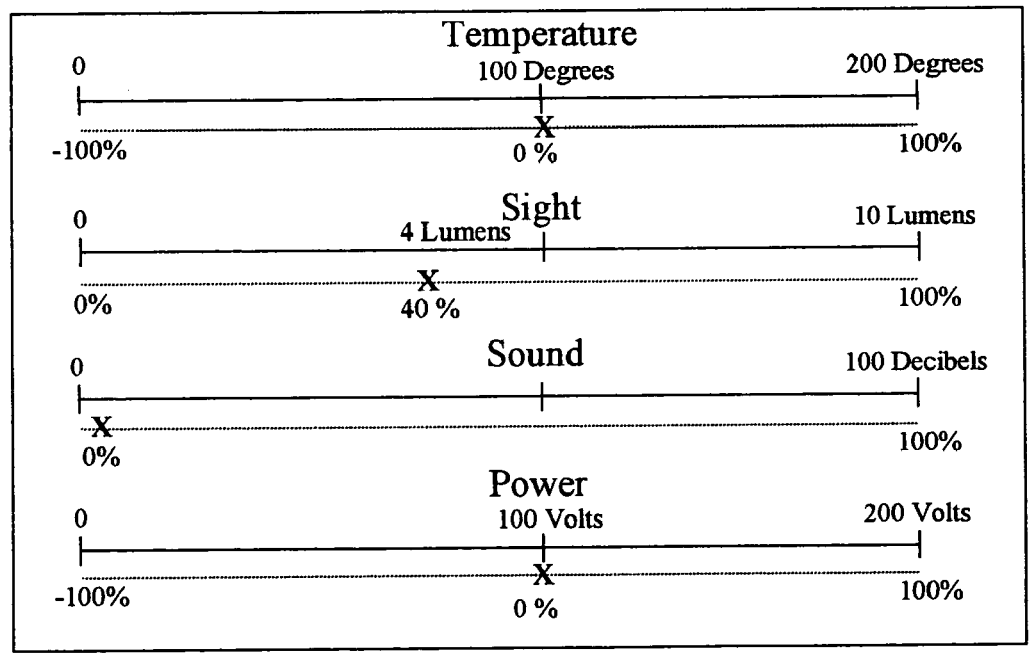
FIG. 5 is a chart of the active range rating of the data shown in FIG. 4.

Initially, we will assume that the system, according to the present invention, such as a robot, in this example, is placed in an empty room. The room is dark with an ambient temperature of 100° F. The robot would be provided with a device for avoiding a harmful stimulus such as legs or wheels for avoiding excess temperature from a source of heat, or a device for closing the robots eyes upon sensing excess light and or vocals to express comfort or discomfort. Other types of movable devices would be used to avoid other types of sensed inputs. There is no detectable sound in the room. The power level is currently 100 volts. A flame is then introduced into the dark room at a distance of 10 feet from the robot. Using its light sensors, the robot will then detect the light intensity produced by the flame as being four lumens. The robot's sensors do not detect any heat from the flame at the distance of 10 feet, as well as any other change by the steady state. The actual real world sensory data is reflected within the active range of the system as shown in FIG. 4. An X is associated with the sensed value of the four lumens included therein. With the exception of the sight parameter, all of the other X's depict a sensed steady state value of the particular parameters. As can be appreciated, the robot would be provided with the appropriate senses for each of the variables. Each of the sensors would transmit its sensed (active range) signal to the active range comparator 103 (FIG. 1). These sensed signals would either be the absolute signal sensed by the sensor, such as 4 lumens or the sensor would transmit the comparative percentile algorithm of the active range directly to the comparator 103. In the case of sight, this would be a 40% value. As can be appreciated, the range of any of the variables shown in FIG. 4 could be changed as well as the range of all of the static range constants could also be changed, depending upon the particular situation.

Figure 6:
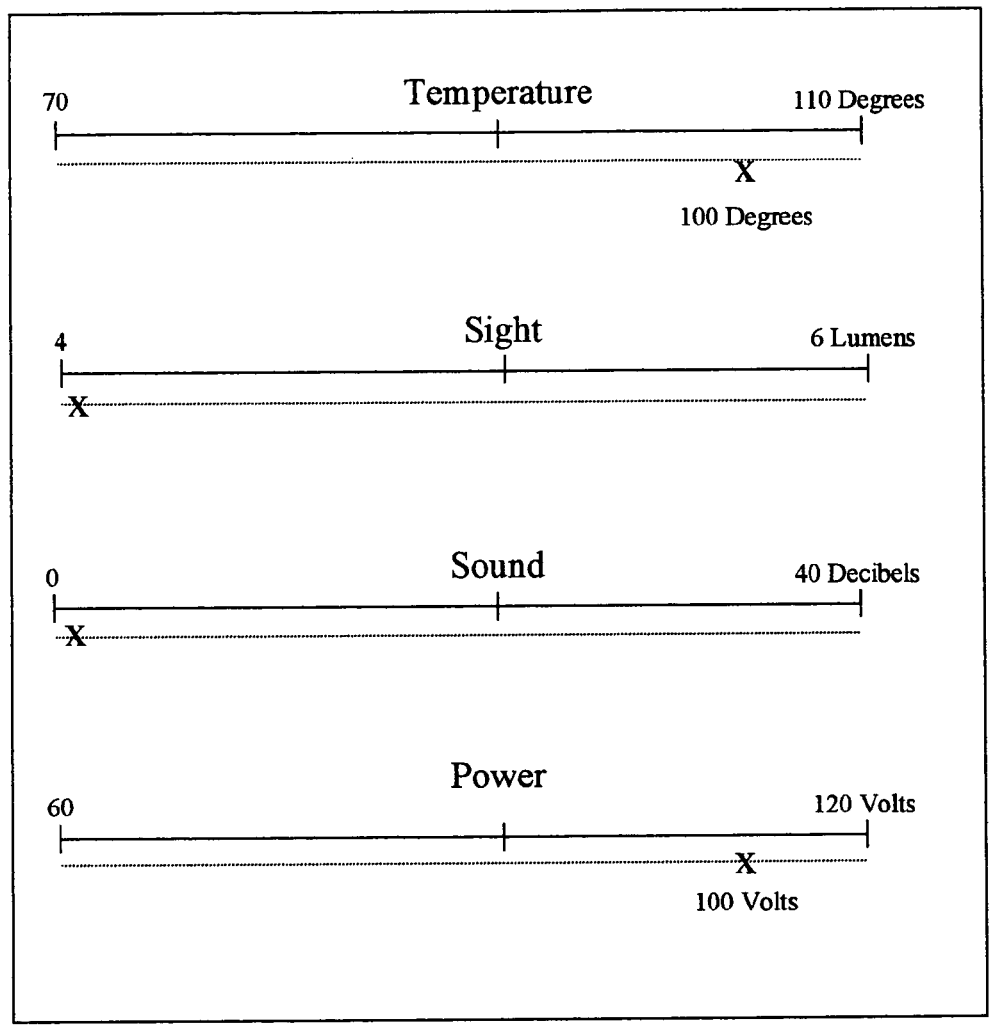
FIG. 6 is a chart showing the static range response to the sensed data of FIG. 4.

The active range sensory comparator would be provided with the appropriate memory and microprocessor to make the appropriate calculations to determine the proper order of intensity. Based upon the present example, FIG. 5 ranks the intensity of all of the sensed values based upon the assigned sensory adjustable parameters in the active range. Since the light of the flame has the highest percentile ranking of 40%, it is therefore adopted as the stimulus of predominance and would be acted upon first. Subsequently, each additional sensory stream in the active range is then compared to its corresponding constant sensory parameter in the static range to determine the impact variation (actual degree of difference between the ranges). This process would establish a difference between the system (static range) and the external world (active range). This difference is shown in FIG. 6 in which each of the sensed variables (active range) is denoted by an X in its appropriate line of the static range. The systems processing determines that all of the ranked sensory data in the active range, when compared to the corresponding static range parameters, to be neutral; that is, they are all within the static range parameters (comfort range). The impact variation is therefore neutral or zero for each of the parameters. The system is content and the response sensor based upon the zero impact variation determines and elicits a neutral attraction response.

As can be appreciated, although the first example only sensed a single non-steady state variable which was acted upon by the system first, all of the other variables were also acted upon by the system subsequent to the sight variable. The information sensed in the unconditioned response shown in the charts of FIGS. 4-6 would be presented to the primary integrator 108 of FIG. 1 as a precursory memory process associating and cataloguing the stimuli/impact/response sequences. The primary integrator would scan the memory 109 for the light intensity of the flame as well as any additional or associated sensory data. Since this is the first time the light intensity of the flame has been processed, it of course was not initially found in the memory. The system would then store this sensed variable in the memory for future reference.

Figure 7:
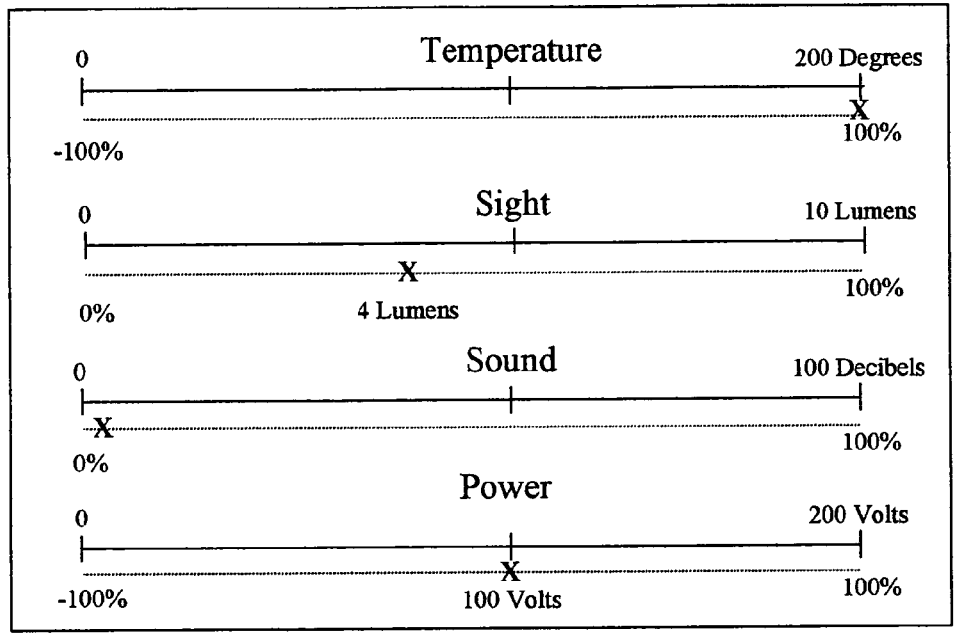
FIG. 7 is a chart showing a second pass of sensed data on the active range.
Figure 8:
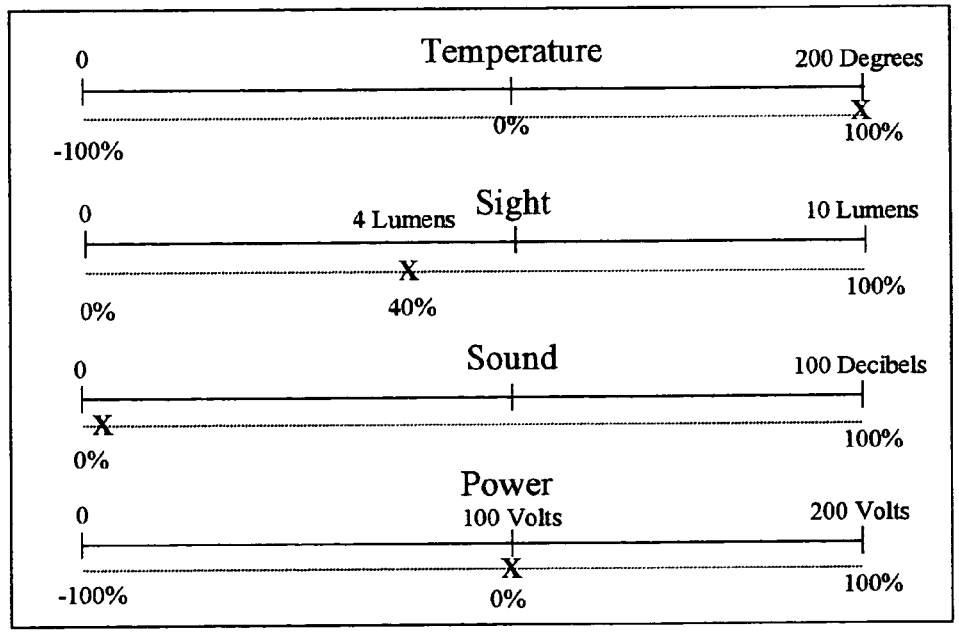
FIG. 8 is a chart of the active range acting on the data shown in FIG. 7.
Figure 9:
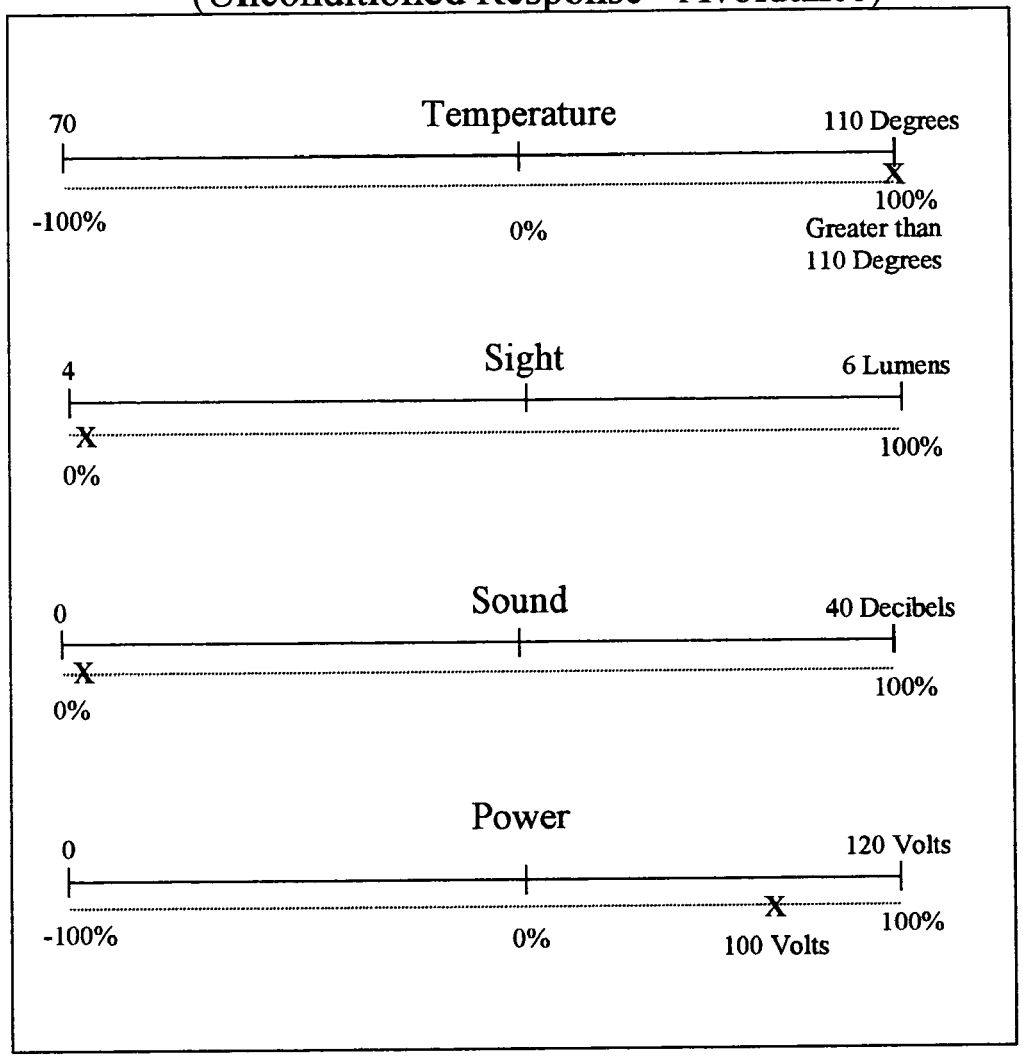
FIG. 9 is a chart showing the static range response to the sensed data of FIG. 7.

FIGS. 7-9 illustrates a second pass in which the flame is moved in close proximity to the robot. In this instance, the light of four lumens has not changed, no sound is detected, and the power parameter of 100 volts has not changed. However, in this example, a temperature of 200 F is sensed by the temperature sensor. Each of the sensed values is denoted by the X in its appropriate line in FIG. 7. The scanning process would determine that the temperature is the highest-ranking sensory stream. Each sensory stream in the active range is compared to its corresponding constant sensory parameter in the static range to determine an impact variation or actual degree of difference between the ranges as shown in FIGS. 8 and 9. As shown in these charts, the active range rating of light would be 40%, whereby the active range rating of heat would be 100% with the active range rating of the other two variables being zero. In this instance, the heat variable would be acted upon first, the light variable would be acted upon second, and the auditory and power variables would be acted upon subsequent to these first two variables.

The system will again determine its unconditioned response by comparing the temperature of 200 F in the active range to the corresponding sensory parameter of the static range. Since the temperature of 200 F exceeds the range parameter which, according to this example is 110 F, and the comparative process between the ranges determines that the impact variation is +90 (200 active range minus 110 maximum static range), the maximum tolerance of the system has been exceeded. Based upon this degree of variation, the response sensor elicits an avoidance response. The frequency of that response increases or decreases in direct proportion to the impact variation, which is determined by the intensity of the adopted stimulus. The stimulus/impact/response is then presented to the primary integrator 108. The system then scans the memory 109 for the temperature of the flame as well as any additional or associated sensory data. Since this is the first time an extreme temperature has been experienced; the system associates the light intensity of the flame (four lumens) with the temperature and updates the memory 109 and avoidance response accordingly. After the temperature variable has been acted upon, the remaining variables, i.e., light, auditory and power, would also be acted upon in the appropriate order.

Figure 10:
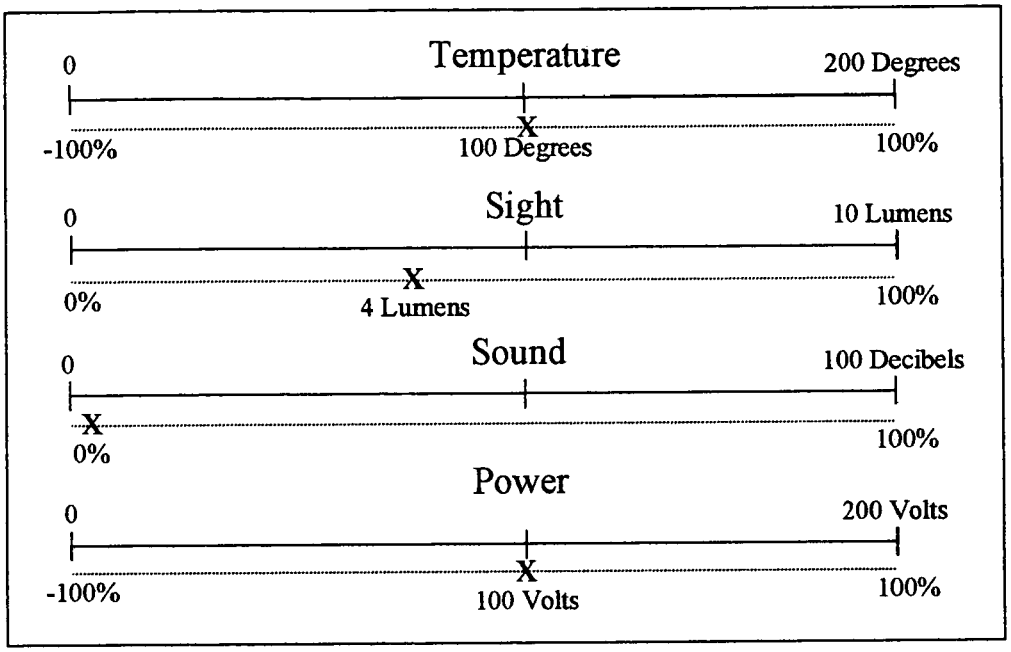
FIG. 10 is a chart showing a third pass of sensed data in the active range.
Figure 11:
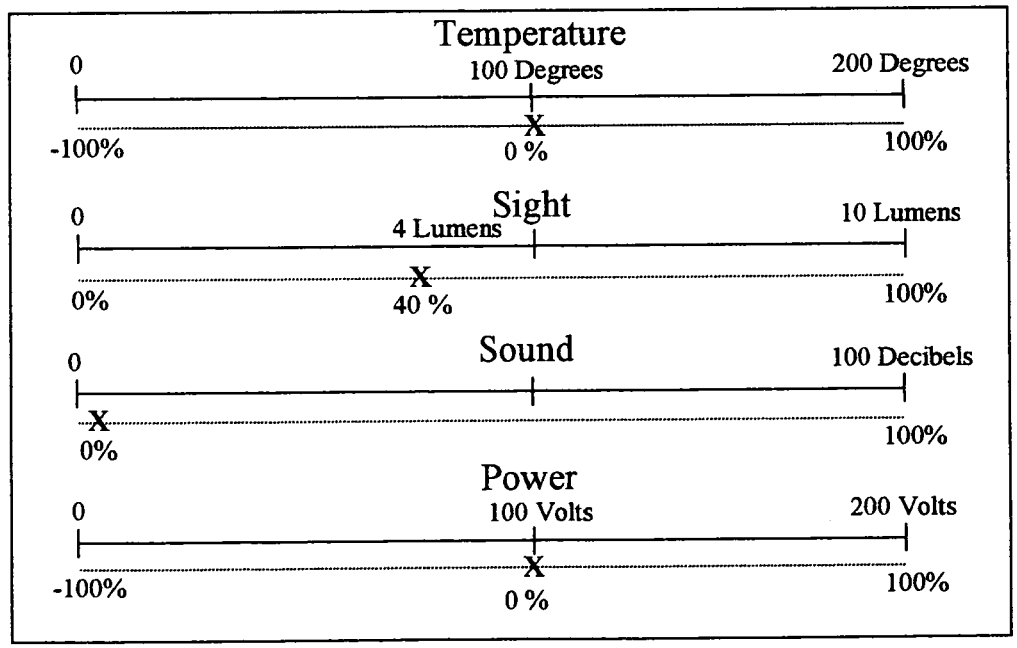
FIG. 11 is a chart of the active range rating of the data shown in FIG. 10.
Figure 12:
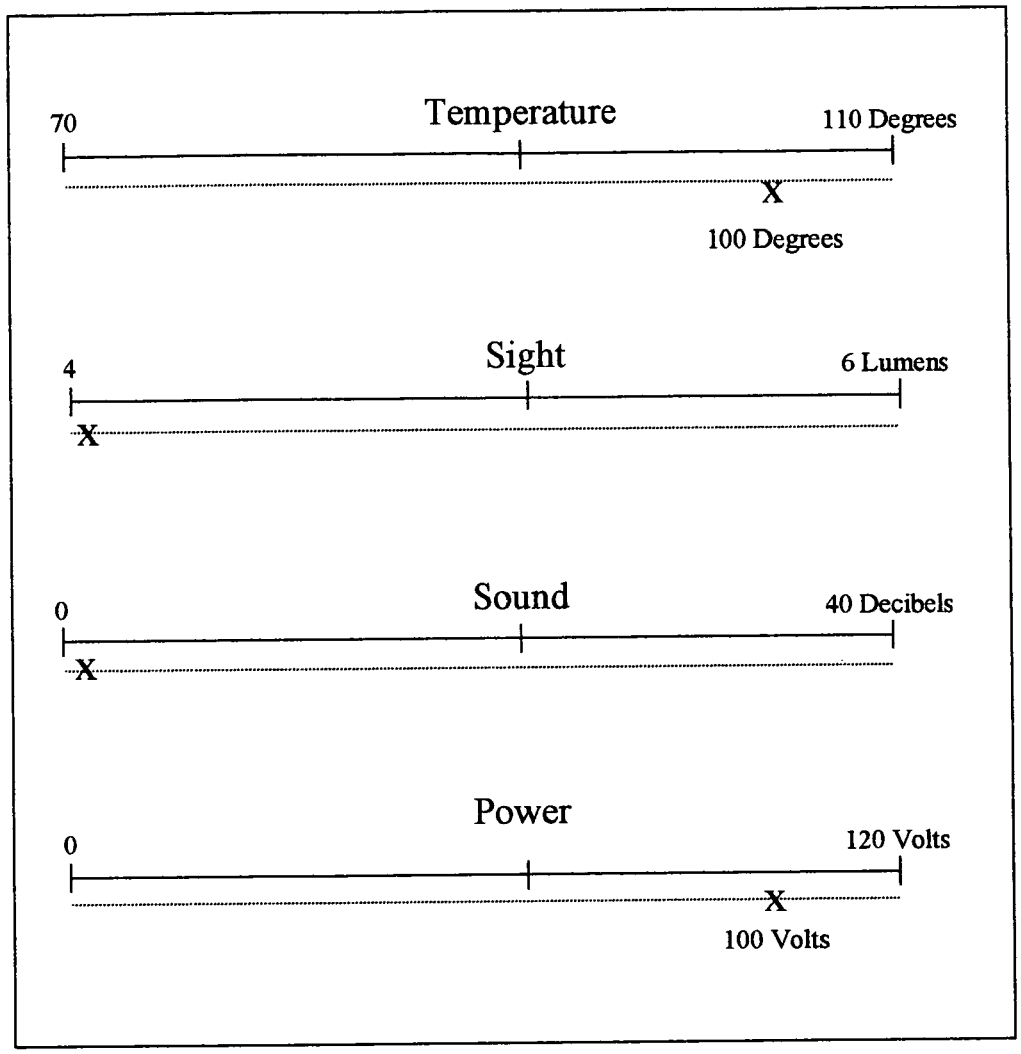
FIG. 12 is a chart showing the static range response to the sensed data of FIG. 10.

FIGS. 10-12 illustrate the example of a conditioned response based upon the first two previously described responses to the introduction of a flame into the room. In this instance, the flame is reintroduced to the environment at a distance of 10 feet from the robot. The system would recognize the flame as a change in the environment and would input all sensory data from it. Since the variables are exactly the same as in the initial pass, the chart of FIG. 10 would be exactly the same as the chart of FIG. 4. Similarly, the chart of FIG. 11 showing the active range of each of the variables would be similar to the chart of FIG. 5. This is true since the system scanning process including the comparative percentile algorithm of each of the variables would be exactly the same. As before, since the light of the flame has the highest percentile rating in the active range, it is therefore adopted as the stimulus of predominance and would be acted upon first. The three other parameters would be acted upon subsequently to that of the light parameter. Similar to the first pass, the static range chart as illustrated in FIG. 12 would be exactly the same as the static range chart shown in FIG. 6. This is true since all of the variables are exactly the same as in the first pass and would be exactly the same when compared to the static range. As such, the system would elicit a neutral response. However, when the stimulus, impact and the neutral response are then presented to the primary integrator 108, the response would be different from that of the first pass. This is true since the system would scan the memory for the light intensity of the flame as well as any additional or associated sensory data to match the current stimuli with previously processed stimuli. This time, a match is found for the light intensity of the flame (4 lumens) and other associated sensory data stored with it. This sensory data includes the previously stored impact variation and avoidance response based upon the temperature in the second pass associated with the light intensity of both the first and second passes. The system will now elicit a conditioned response (a learned response) of avoidance based upon the previously experienced data.

These examples demonstrate that based upon prior experience and retrieved by single sensory modality cue; the robot retains sensory data objectivity when sensory data is internalized. The system did not have to experience a burn to elicit the avoidance response. It did so by associating a single sensory modality cue, the light intensity of a flame in the absence of heat to retrieve a prior experience (the burn) and elicit the proper response.

In addition, the systems processing facilitates labeling, (forms word/object associations). Using the example of the flame, 0031-0034, FIGS. 7-12, after the robot experienced the heat of the flame, should someone say the word "hot" to the robot, the auditory sensory stream is acted upon, subsequent to the heat and light variables. As such, the experience, (the burn, "impact and avoidance response") is retrieved by the single sensory modality cue "HOT', an auditory sensory stream, just as the sight of the flame (in the absence of heat) retrieve the data.

Further, as the system processes an enormous amount of sensory data a memory device could become saturated in a relatively short period of time. The systems processing addresses this problem by a scanning process that deletes data, (stimulus/impact/response), based on the intensity of the impact variation. An adjustable process whereby stimulus impact response experiences over a determined impact intensity are held and under a determined impact intensity deleted. This scanning process applies to both attraction (comfort), and avoidance (discomfort) experiences. The process eliminates the need to manually defrayment memory.

Power is processed in the same manner as other sensory data. By doing so and by utilizing a finite power supply, the system can respond to power as it does to other stimuli. Specifically, the system can respond to a change in the power level, drop, or surge, which would also draw either an attraction (comfort) or avoidance (discomfort) response. This process intrinsically motivates (compels) the system to replenish its energy supply.

Although illustrative embodiments of the present invention have been described above in connection with the drawings, it is foreseen that the invention is not to be limited to those precise embodiments and that various modifications can be made by persons skilled in the art without departing from the scope and spirit of the invention.

What is claimed is:

1. A method of eliciting a response to external stimuli by a robotic device, comprising the steps of:
   determining a static range of potential first stimuli;
   inputting said static range of each of said first stimuli into a first memory device;
   determining an actual range of each of said first stimuli;
   sensing the actual value of each of said first stimuli;
   calculating the absolute value of said actual value of each of said first stimuli;
   comparing all of said absolute values of said first stimuli with each other to determine the intensity of each of said first stimuli;
   comparing said actual value of each of said first stimuli with said static range of each of said first stimuli to establish an impact variation; and
   determining whether said impact variation of each of said first stimuli is within said static range of each of said first stimuli.

2. The method in accordance with claim 1, including the step of updating a second memory device based upon said impact variation with respect to said first stimuli.

3. The method in accordance with claim 2, further including the step of moving said robotic device away from one of said first stimuli, when said impact variation of at least one of said first stimuli is outside of its respective static range.

4. The method in accordance with claim 1, wherein said first stimuli includes light and temperature.

5. The method in accordance with claim 1, wherein said first stimuli includes power.

6. A system for eliciting a response to external stimuli by a robotic device comprising:
   a plurality of sensors for sensing the actual value of a plurality of stimuli;
   a calculating device for determining the intensity value of said active value of each of said stimuli;
   a first memory device provided with a static range of each of said plurality of stimuli;
   a comparison device for comparing said intensity value of each of said actual value with each other and for comparing said intensity values with said static range of values; and an actuating device for actuating the movement of at least one moveable device based upon an output generated by said comparison device.

7. The system in accordance with claim 6, further including a second memory device for including information stored therein based upon said intensity values of each of said plurality of stimuli.

* * * * *